United States Patent
Ho et al.

(10) Patent No.: US 9,727,049 B2
(45) Date of Patent: Aug. 8, 2017

(54) QUALITATIVE FAULT DETECTION AND CLASSIFICATION SYSTEM FOR TOOL CONDITION MONITORING AND ASSOCIATED METHODS

(75) Inventors: Chia-Tong Ho, Taipei (TW); Po-Feng Tsai, Taipei (TW); Jung-Chang Chen, Hsinchu (TW); Tze-Liang Lee, Hsinchu (TW); Jo Fei Wang, Hsin-Chu (TW); Jong-I Mou, Hsinpu (TW); Chin-Hsiang Lin, Hsin-Chu (TW)

(73) Assignee: TAIWAN SEMICONDUCTOR MANUFACTURING COMPANY, LTD., Hsin-Chu (TW)

( * ) Notice: Subject to any disclaimer, the term of this patent is extended or adjusted under 35 U.S.C. 154(b) by 926 days.

(21) Appl. No.: 13/603,079

(22) Filed: Sep. 4, 2012

(65) Prior Publication Data
US 2014/0067324 A1    Mar. 6, 2014

(51) Int. Cl.
*G06F 19/00*    (2011.01)
*G05B 19/4065*    (2006.01)

(52) U.S. Cl.
CPC ............ *G05B 19/4065* (2013.01); *G05B 2219/37252* (2013.01); *G05B 2219/45031* (2013.01)

(58) Field of Classification Search
CPC .............. G05B 19/4065; G05B 2219/45031
See application file for complete search history.

(56) References Cited

U.S. PATENT DOCUMENTS

| | | | |
|---|---|---|---|
| 5,212,645 A | 5/1993 | Wildes et al. | |
| 6,431,769 B1 * | 8/2002 | Fukuda | G03F 7/162 396/611 |
| 6,804,619 B1 | 10/2004 | Chong et al. | |
| 6,952,656 B1 * | 10/2005 | Cordova et al. | 702/117 |
| 7,117,058 B2 | 10/2006 | Lin et al. | |
| 2004/0068394 A1 * | 4/2004 | Maekawa | B23Q 11/04 702/185 |
| 2006/0247803 A1 | 11/2006 | Mori | |
| 2012/0109582 A1 | 5/2012 | Moriya et al. | |
| 2013/0150997 A1 * | 6/2013 | Tsai | C23C 16/52 700/121 |

OTHER PUBLICATIONS

Western Electric Company, Statistical Quality Control Handbook, Mack Printing Company, 1956.*
Po Feng Tsai et al., "Developing Smart FDC Algorithms with Domain Knowledge and Statistical Methodologies", AEC/APC Symposium Asia 2011, 2 pages.

* cited by examiner

*Primary Examiner* — Mischita Henson
*Assistant Examiner* — Christine Liao
(74) *Attorney, Agent, or Firm* — Haynes and Boone, LLP (57) ABSTRACT

The present disclosure provides various methods for tool condition monitoring, including systems for implementing such monitoring. An exemplary method includes receiving data associated with a process performed on wafers by an integrated circuit manufacturing process tool; and monitoring a condition of the integrated circuit manufacturing process tool using the data. The monitoring includes evaluating the data based on an abnormality identification criterion, an abnormality filtering criterion, and an abnormality threshold to determine whether the data meets an alarm threshold. The method may further include issuing an alarm when the data meets the alarm threshold.

19 Claims, 4 Drawing Sheets

QUALITATIVE FAULT DETECTION AND CLASSIFICATION SYSTEM FOR TOOL CONDITION MONITORING AND ASSOCIATED METHODS

BACKGROUND

Integrated circuits are fabricated by processing wafers with a series of wafer fabrication tools (referred to as processing tools). Each processing tool typically performs a wafer fabrication task (referred to as a process) on the wafers according to a predefined (or predetermined) process recipe that specifies various parameters of the process. For example, IC manufacturing typically uses multiple process steps that require many process tools, both production and support related, such that IC manufacturers often focus on monitoring a process tool's hardware and associated process to ensure and maintain stability, repeatability, and yields in IC manufacturing. Such tool monitoring may be achieved by fault detection and classification (FDC) systems, which monitor tools during processing and identify faults in the tools that causes the processing to stray from that which is expected. Although existing process tool monitoring methods and systems have been generally adequate for their intended purposes, they have not been entirely satisfactory in all respects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 1:
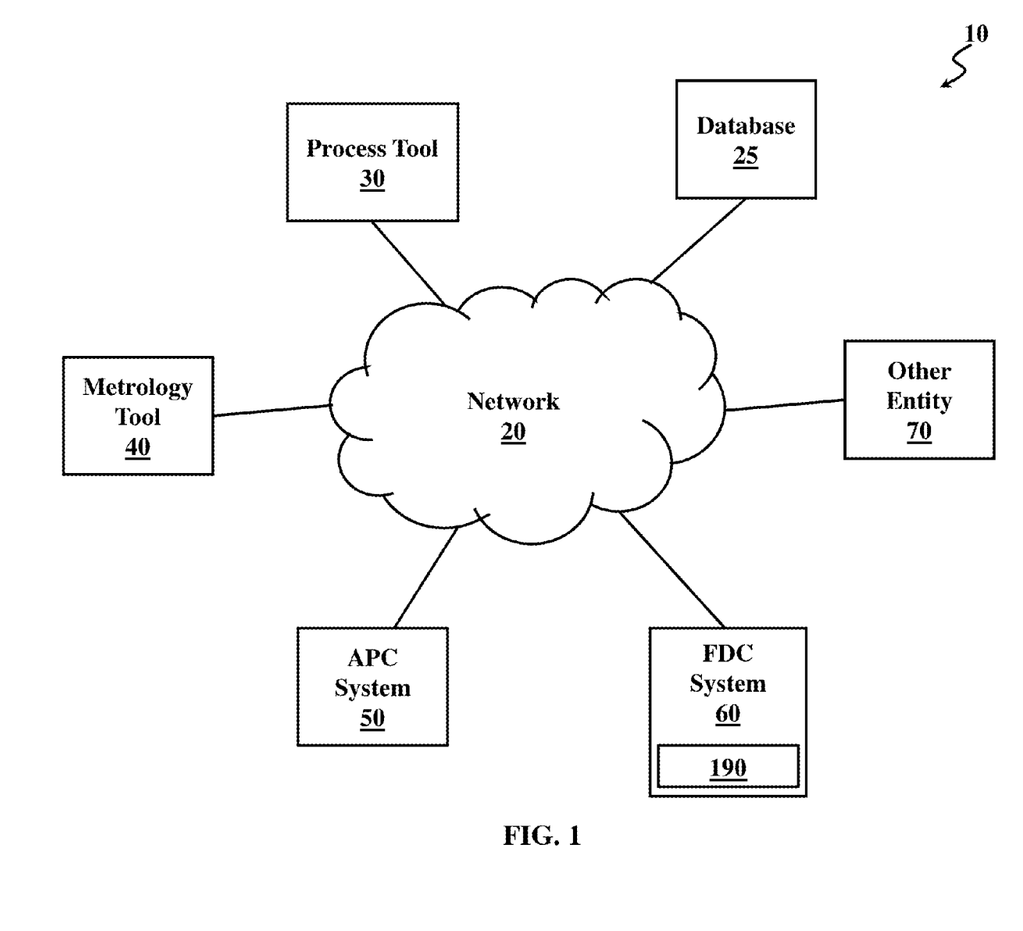
FIG. 1 is a block diagram of an integrated circuit device fabrication system according to various aspects of the present disclosure.

FIG. 1 is a block diagram of an integrated circuit manufacturing system 10 according to various aspects of the present disclosure. The integrated circuit manufacturing system 10 may be a virtual integrated circuit manufacturing system (a "virtual fab"). The integrated circuit manufacturing system 10 implements integrated circuit manufacturing processes to fabricate integrated circuit devices. For example, the integrated circuit manufacturing system 10 may implement semiconductor manufacturing processes that fabricate substrates (or wafers). A substrate includes a semiconductor substrate, a mask (photomask or reticle, collectively referred to as mask), or any base material on which processing is conducted to produce layers of material, pattern features, and/or integrated circuits. In FIG. 1, the integrated circuit manufacturing system 10 has been simplified for the sake of clarity to better understand the inventive concepts of the present disclosure. Additional features can be added in the integrated circuit manufacturing system 10, and some of the features described below can be replaced or eliminated in other embodiments of the integrated circuit manufacturing system 10.

The integrated circuit device fabrication system 10 includes a network 20 that enables various entities (a database 25, a process tool 30, a metrology tool 40, an advanced process control (APC) system 50, a fault detection and classification (FDC) system 60, and other entity 70) to communicate with one another. The integrated circuit manufacturing system 10 may include more than one of each of the entities in the depicted embodiment, and may further include other entities not illustrated in the depicted embodiment. In the present example, each entity of the integrated circuit manufacturing system 10 interacts with the other entities via the network 20 to provide services to and/or receive services from the other entities. The network 20 may be a single network or a variety of different networks, such as an intranet, an Internet, other network, or combinations thereof. The network 20 includes wired communication channels, wireless communication channels, or combinations thereof.

The database 25 stores data associated with the integrated circuit manufacturing system 10, and particularly data associated with the integrated circuit fabrication processes. In the depicted embodiment, the database 25 stores data collected from the process tool 30, the metrology tool 40, the APC system 50, the FDC system 60, the other entity 70, or a combination thereof. For example, the database 25 stores data associated with wafer characteristics of wafers processed by the process tool 30 (such as that collected by the metrology tool 40 as further described below), data associated with parameters implemented by the process tool 30 to process such wafers, data associated with analysis of the wafer characteristics and/or parameters by the APC system 50 and the FDC system 60, and other data associated with the integrated circuit manufacturing system 10. In an example, the process tool 30, metrology tool 40, APC system 50, FDC system 60, and other entity 70 may each have an associated database.

The process tool 30 performs an integrated circuit fabrication process. In the present example, the process tool 30 is a chemical vapor deposition (CVD) tool used for epitaxial growth. The process tool 30 may thus be referred to as a CVD epitaxial tool. A wafer can be placed into the CVD epitaxial tool and subjected to an epitaxial process, such as vapor-phase epitaxy, to form an epitaxial feature of the wafer. The CVD epitaxial tool may include a chamber, a gas source, an exhaust system, a heat source, a cooling system, and other hardware. The chamber serves as a controlled environment for performing the epitaxial process. The gas source provides reactant and purging gases during the epitaxial process, and the exhaust system maintains a pressure within the chamber during the epitaxial process. The heat source includes lamp modules, for example: a bottom inner lamp module, a bottom outer lamp module, a top inner lamp module, and a top outer lamp module. Each lamp module includes an array of infrared lamps that transmit energy to the chamber of the CVD epitaxial tool during the epitaxial process, thereby heating the chamber to a desired chamber temperature and/or the wafer to a desired wafer temperature during the epitaxial process.

To ensure that the epitaxial feature exhibits target wafer characteristics (such as thickness, constituent concentrations, and sheet resistance), the epitaxial process forms the epitaxial feature according to a predetermined (or predefined) epitaxial process recipe. The predetermined (or predefined) epitaxial process recipe specifies various parameters that are implemented by the CVD epitaxial tool to achieve the target wafer characteristics. Such parameters include process time, type of precursor gas, flow rate of precursor gas, chamber temperature, chamber pressure, wafer temperature, other parameters, or combinations thereof. During the epitaxial process, the various hardware of the CVD epitaxial tool (such as the chamber, gas source, exhaust system, heat source, and cooling system) are configured to achieve the specified parameters. The process tool 30 includes sensors that monitor the parameters during processing of the wafers, such as during the epitaxial process. For example, the CVD epitaxial tool includes sensors that monitor the various parameters associated with the CVD epitaxial tool, such as chamber pressure, chamber temperature, wafer temperature, gas flow, deposition time, other parameters (such as various characteristics of the lamp modules of the CVD epitaxial tool, including voltage, current, power, resistance, other characteristic, or combinations thereof), or combinations thereof.

The metrology tool 40 measures and collects data associated with wafers during integrated circuit fabrication. For example, the metrology tool 40 performs inline measurements on the processed wafers to obtain information about various wafer characteristics of the wafers, such as a critical dimension of a feature of the wafer (for example, a line width of the feature), a thickness of a material layer of the wafer, an overlay accuracy between layers or features of the wafer, a dopant profile (or concentration) of a feature, a size and/or type of defect, electrical characteristics of a feature, other wafer characteristics, or combinations thereof. In the depicted embodiment, the metrology tool 40 measures wafer characteristics of wafers processed by the process tool 30. For example, the metrology tool 40 measures a thickness, electrical properties (such as sheet resistance), surface roughness, other characteristics, or combinations thereof of the epitaxial features of the wafers formed by the epitaxial process performed by the process tool 30. The metrology tool 40 may include electrical tools, optical tools, analytical tools, other tools, or combinations thereof to measure and collect such data. Such tools include microscopes (for example, scanning electron microscopes and/or optical microscopes), micro-analytical tools, line width measurement tools, mask and reticle defect tools, particle distribution tools, surface analysis tools, stress analysis tools, resistivity and contact resistance measurement tools, mobility and carrier concentration measurement tools, junction depth measurement tools, film thickness tools, gate oxide integrity test tools, capacitance-voltage measurement tools, focused ion beam (FIB) tools, laser surface defect scanners, residual gas analyzers, process tool particle counters, wafer assessment testing tools, other metrology tools, or combinations thereof.

The APC system 50 monitors wafer characteristics of the processed wafers and uses inline metrology data (for example, such as data collected by the metrology tool 40), process models, and various algorithms to provide dynamic fine-tuning of intermediate process targets to enhance final device targets of the wafers. Fine-tuning such process targets may be referred to as control actions, which compensate for tool issues and/or process issues that may produce wafer characteristic variations. The APC system 50 can implement control actions in real time, wafer-to-wafer, lot-to-lot, or a combination thereof. In the depicted embodiment, the APC system 50 implements control actions to modify the epitaxial process recipe performed by the process tool 30 to form the epitaxial features of the wafers. For example, the APC system 50 (based on inline metrology data of processed wafers, process models, and various algorithms) modifies the predetermined epitaxial process recipe (specifically the parameters implemented by the process tool 30, such as process time, flow rate of gas, chamber pressure, chamber temperature, wafer temperature, or other process parameter) for each processed wafer to ensure that the epitaxial features of each processed wafer exhibit the target characteristics.

The FDC system 60 evaluates conditions of the process tool 30 to detect tool issues, such as tool condition deterioration, by monitoring the parameters implemented by the process tool 30 during the integrated circuit fabrication process, and wafer characteristics achieved by parameters implemented by the process tool 30 during the integrated circuit fabrication process. Typically, the FDC system 60 implements statistical process control (SPC) to track and analyze a condition of the process tool 30. For example, the FDC system 60 may implement SPC charts that document historical process performance of the process tool 30 by charting SPC data associated with the process over time. Such SPC data includes the parameters and/or the wafer characteristics associated with multiple wafers processed by the process tool 30. When the SPC data indicates that parameters and/or wafer characteristics have departed from acceptable targets (in other words, when the FDC system 60 detects a fault or abnormality), the FDC system 60 triggers an alarm and notifies an operator of the process tool 30, halt the process performed by the process tool 30, take another action, or a combination thereof, so that any issues with the process tool 30 may be identified and remedied.

In the present example, to detect issues with the CVD epitaxial tool, the FDC system 60 monitors the parameters implemented by the process tool 30 to form the epitaxial features of the wafers. The FDC system 60 evaluates these parameters and wafer characteristics to detect abnormalities, or faults, during operation of the CVD epitaxial tool. In an example, an abnormality is indicated when, during an epitaxial process, a chamber pressure or chamber temperature varies (higher or lower) significantly from a specified chamber pressure or chamber temperature, such as the predetermined epitaxial process recipe. In another example, an abnormality is indicated when, during an epitaxial process, a flow rate of a precursor gas varies (higher or lower) significantly from a specified flow rate of the precursor gas, such as the predetermined epitaxial process recipe. In yet another example, an abnormality is indicated when a characteristic, such as sheet resistance, of epitaxial features of the wafers formed by the CVD epitaxial tool varies significantly from its target characteristic. Such abnormalities may indicate issues with the process tool 30. For example, damaged or aging hardware of the CVD epitaxial tool may cause the chamber pressure, chamber temperature, and/or flow rate of precursor gas to vary from the expected chamber pressure, chamber temperature, and/or flow rate of precursor gas. In the present example, it has been observed that a resistance of the lamps correlates with a condition of lamp modules of the CVD epitaxial tool. For example, the resistance of a lamp module tends to decrease significantly right before lamps of the lamp module burn out. The FDC system 60 can thus monitor the resistance of each lamp module of the CVD epitaxial tool (for example, the bottom inner lamp module, the bottom outer lamp module, the top inner lamp module, and the top outer lamp module) to detect abnormalities, or faults, of each lamp module. The FDC system 60 can also monitor the resistance of the lamp modules to predict when the lamps of the lamp modules will burn out so that the lamps can be replaced before such burn out.

Figure 2:
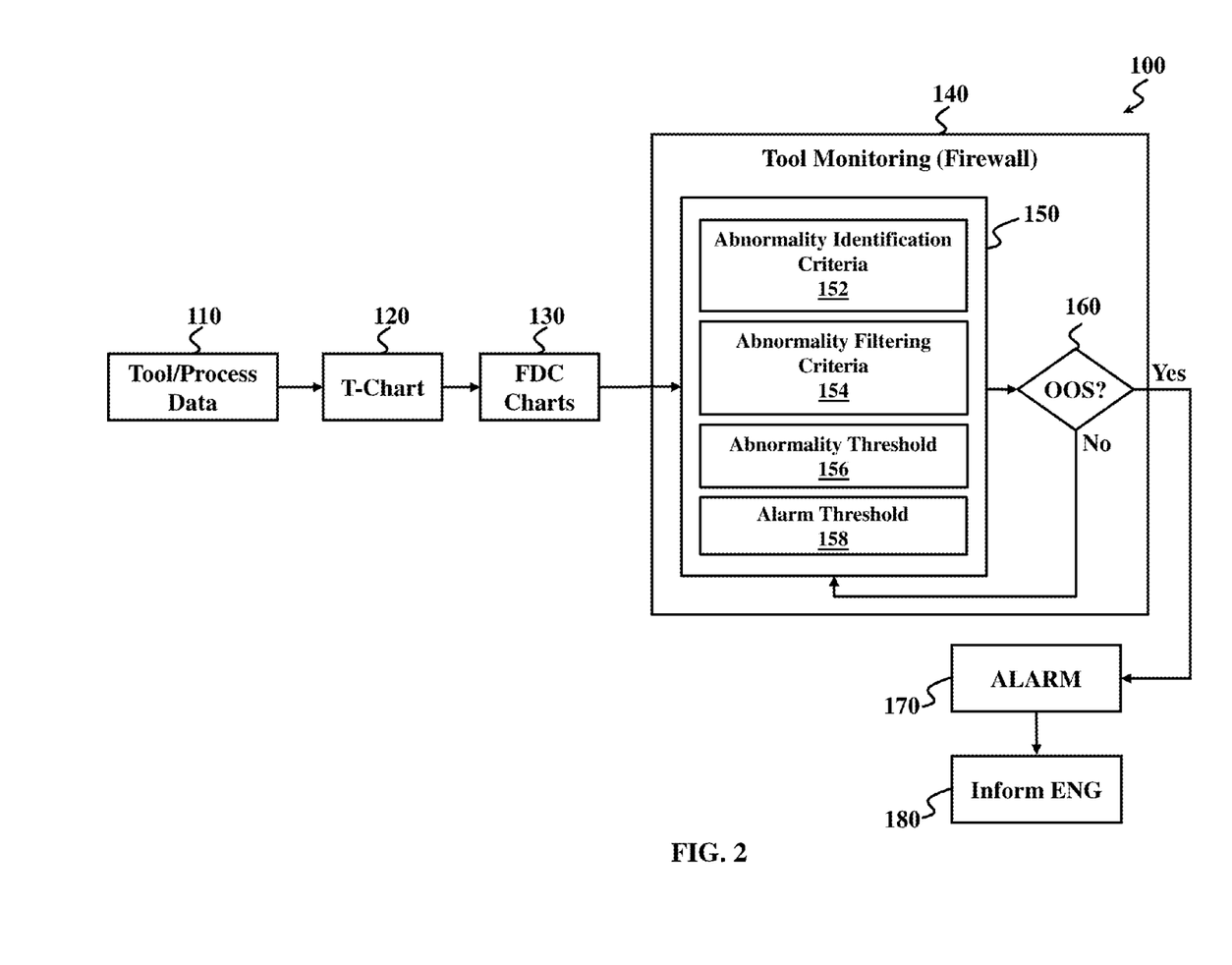
FIG. 2 is a block diagram of a tool monitoring process flow that can be implemented by an integrated circuit manufacturing system, such as the integrated circuit manufacturing system of FIG. 1, according to various aspects of the present disclosure.

FIG. 2 is a block diagram of a tool monitoring process flow 100 that can be implemented by the integrated circuit manufacturing system 10 of FIG. 1 according to various aspects of the present disclosure. The FDC system 60 implements the tool monitoring process flow 100 to monitor a condition of the process tool 30 (in the present example, the CVD epitaxial tool). The tool monitoring process flow 100 evaluates behavior of data collected and analyzed by the FDC system 60 to detect faults in the process tool 30, such as a deteriorating condition of a portion of the process tool. In the present example, the tool monitoring process flow 100 evaluates FDC data that indicates a condition of the lamp modules of the CVD epitaxial tool, specifically, a resistance of the lamps of each lamp module. Additional steps can be provided in the tool monitoring process flow 100, and some of the steps described can be replaced or eliminated for additional embodiments of the tool monitoring process flow 100. Further, the following discussion related to CVD epitaxial tool condition is exemplary only, and it is contemplated that the tool monitoring process flow 100 can be implemented by the integrated circuit manufacturing system 10 to monitor condition of any type of process tool 30 and any type of module of the process tool 30.

At block 110 and block 120, data associated with various processed wafers is collected and compiled in time-series charts (T-charts). The data includes parameter data associated with the parameters implemented by the process tool 30 to form the epitaxial features of each wafer. As noted above, the parameters include chamber pressure, chamber temperature, wafer temperature, gas flow, deposition time, other parameters (such as various characteristics of the lamp modules of the CVD epitaxial tool, including voltage, current, power, resistance, other characteristics, or combinations thereof). The data also includes wafer data associated with the wafer characteristics of the processed wafers, such as sheet resistance of the processed wafers. The wafer data may further include thicknesses of the epitaxial features of the processed wafers, other electrical characteristics of the epitaxial features of the processed wafers, other wafer characteristics, or combinations thereof. Such wafer data and parameter data is collected for each of the parameters associated with the process tool 30 and wafer characteristics associated with the processed wafers, and the wafer data and parameter data may be stored in the database 25 or other database associated with the process tool 30. In the present example, for the sake of clarity to better understand the inventive concepts of the present disclosure, the following discussion will be limited to the tool monitoring process flow 100 evaluating the condition of the process tool 30 by monitoring data associated with a single process parameter, specifically, parameter data associated with a resistance of a lamp module of the CVD epitaxial tool during processing. Such discussion is not intended to be limiting, and the present disclosure contemplates that the tool monitoring process flow 100 can monitor the parameter and wafer data to evaluate the condition of the process tool 30 (including evaluating a condition of various hardware of the process tool 30).

At block 130 and block 140, statistical analysis is performed on the time-series data (T-charts), thereby reducing the amount of data for evaluation, and tool monitoring is performed based on the statistically analyzed time-series data. For example, at block 130, statistical process control is implemented by the FDC system 60 to transform the time-series parameter and wafer data into control charts (for example, Xbar-R control charts, Xbar-S control charts, I-MR control charts, C control charts, U control charts, Z control charts, other control charts, or combinations thereof) that can be used to evaluate a condition of the process tool 30. The control charts analyze the time-series data according to statistics, where the process limits are defined by the statistical analysis (such as a standard deviation of the analyzed data). For example, the control charts include a centerline that represents an average (mean) value of the analyzed data, and an upper control limit (maximum) and lower control limit (minimum) defined by statistical analysis, particularly within a number of standard deviations of the analyzed data. The FDC system 60 also establishes a probability model that corresponds with the statistically analyzed time-series data. Such probability model can be used to identify significant changes in the statistically analyzed time-series data.

In the present example, the time-series parameter data includes resistance values associated with lamps of one of the CVD epitaxial tool's lamp modules (such as the top inner lamp module) during processing. The time-series resistance data is transformed into data that provides a variance (change) between the resistance (R) and an initial resistance ($R_0$) of the lamps. Each change in resistance ($\Delta R$) is determined by:

$$\Delta R = \frac{(R_0 - R)}{R_0} \qquad (1)$$

The time-series resistance change data is then transformed into control charts. For example, statistical analysis reduces the parameter data points (in the present example, change in resistance data points) collected such that it is represented by an average (mean), a standard deviation, a maximum, and a minimum associated with the single parameter (here, change in resistance). In an example, the time-series resistance change data is reduced into the control charts using a moving window averaging, specifically using a five parameter data point moving window. For example, an average resistance change ($\bar{x}$) at a point in time (t) is determined by the following moving window average:

$$\bar{x}(t) = \frac{\sum_{k=0}^{4} x(t-k)}{5} \qquad (2)$$

Discretization then normalizes the average resistance changes. In the present example, a z-normalization is applied to the average resistance changes, which involves mean-centering each average resistance change data point and then scaling each average resistance change data point with its standard deviation, expressed in the following equation:

$$z(t) = \frac{\bar{x}(t) - \mu(t)}{\sigma(t)} \quad (3)$$

where z(t) is the scaled value of the average resistance change ($\bar{x}(t)$), μ(t) is the mean value of the average resistance change ($\bar{x}(t)$), and σ(t) is the standard deviation for the average resistance change ($\bar{x}(t)$). Equation 3 converts the average resistance change ($\bar{x}(t)$) to z(t) by making an assumption that the relative importance of the average resistance change ($\bar{x}(t)$) is directly related to the standard deviation. Based on the scaled value of each average resistance change, each average resistance change is assigned a discrete level: 1 (indicating that the average resistance change is greater than the normal range), 0 (indicating that the average resistance change is within a normal range), or −1 (indicating that the average resistance change is less than the normal range). A probability model corresponding with the scaled values (z(t)) of the average resistance changes is also established. For example, a normal distribution probability plot for the scaled values (z(t)) of the average resistance changes is established such that the FDC system 60 can identify when a scaled value of the average resistance changes indicates abnormal behavior of the process tool 30. The foregoing reduction of parameter data is merely exemplary, and it is understood that any reduction of the parameter data that facilitates evaluating behavior of the parameter data is contemplated by the present disclosure.

Tool monitoring is performed using the control charts and established probability model. At block 150 and block 160, various rules (collectively referred to as an FDC algorithm) are applied to the statistically analyzed parameter data of the control charts to determine whether such data is out of specification (OOS). Out of specification data exhibits behavior that indicates a fault (or abnormality) in the process tool 30. In the present example, statistically analyzed parameter data is out of specification when it exhibits behavior associated with diminished quality of the lamps of the CVD epitaxial tool's lamp module (such as behavior indicating that the lamps are near an end of their lifetime (in other words, about to burn out). The various rules include abnormality identification criteria at block 152, abnormality filtering criteria at block 154, abnormality threshold at block 156, and alarm threshold at block 158. The abnormality identification criteria, abnormality filtering criteria, abnormality threshold, and alarm threshold are tunable so that sensitivity of the tool monitoring implemented by the FDC system 60 can be adjusted based on any number of considerations, including but not limited to, a type of the process tool 30, a technology generation of wafers processed by the process tool 30, an effect a condition of the process tool 30 has on the wafers it processes, a balancing of quality of wafers processed with time and cost to process such wafers, or a combination thereof. In the present example, the FDC system 60 includes an FDC algorithm module 190 for evaluating the statistically analyzed parameter data using the abnormality identification criteria, abnormality filtering criteria, abnormality threshold, and alarm threshold. The FDC algorithm module 190 may include separate modules for each criteria/threshold.

The abnormality identification criteria, at block 152, define behavior of the statistically analyzed parameter data that indicates abnormalities (or faults) of the process tool 30 so that such behavior (or abnormalities of the process tool 30) is automatically identified by the FDC system 60. More specifically, the abnormality identification criteria statistically identify significant variations (changes) in the statistically analyzed parameter data. The abnormality identification criteria thus essentially tune amplitude sensitivity of the tool monitoring. For example, the abnormality identification criteria specify a significance level, such as a significance level of 99.9%, that indicates abnormal behavior of the process tool 30. In the present example, the scaled values (z(t)) of the average resistance changes are evaluated using the probability model and the abnormality identification criteria (specifically the significance level of 99.9%) to identify abnormal behavior of the statistically analyzed parameter data. The scaled values (z(t)) that have less than a 0.1% chance of occurring based on the probability model are designated as abnormalities.

The abnormality filtering criteria, at block 154, define behavior of the statistically analyzed parameter data that indicates real (actual) abnormalities of the process tool 30. The abnormality filtering criteria is applied to the statistically analyzed parameter data in the control charts that meets the abnormality identification criteria at block 152. The abnormality filtering criteria thus filters the identified abnormalities to find real (actual) abnormalities—abnormalities that actually indicate an issue with the process tool 30. In the present example, the abnormality filtering criteria are Western Electric Rules. For example, the statistically analyzed parameter data identified by the abnormality identification criteria exhibits a real abnormality when eight consecutive data points fall on a same side of a centerline of the control chart to which it belongs. Other zone rules of the Western Electric Rules may be applied to the statistically analyzed parameter data that meets the abnormality identification criteria. Alternatively, other rules and models that can detect non-random conditions in the control charts (in other words, detect statistically analyzed parameter data that indicate a real abnormality) may be implemented as the abnormality filtering criteria.

The abnormality threshold, at block 156, defines behavior in the statistically analyzed parameter data that indicates real (actual) abnormalities of the process tool 30 based on historical data associated with the process tool 30. The abnormality threshold is applied to the statistically analyzed parameter data in the control charts that meets the abnormality identification criteria at block 152 and the abnormality filtering criteria at block 154. Historical data refers to engineering/process knowledge. For example, where it has been observed that a real abnormality in the process tool 30 consistently occurs when the statistically analyzed parameter data exhibits a specific behavior (such as exceeding an upper or lower limit), such behavior is established as the abnormality threshold. The abnormality threshold incorporates engineering (domain) experience and knowledge into identifying real abnormalities of the process tool 30. In the present example, it has been observed that lamps of the CVD epitaxial tool's lamp module typically affect wafer processing once a change in resistance of between 2% and 3%. The abnormality threshold is thus specified as 2.5%, such that any observance of a change in resistance greater than or equal to about 2.5% is identified as a real abnormality.

The alarm threshold, at block 156, defines when to issue an alarm based on the abnormality identification criteria, abnormality filtering criteria, and the abnormality threshold. For example, the alarm threshold specifies that the FDC system 60 issues an alarm when the statistically analyzed parameter data exhibits behavior meeting the abnormality identification criteria, abnormality filtering criteria, and the abnormality threshold. In the present example, the alarm threshold specifies that the FDC system 60 issues an alarm when the statistically analyzed parameter data meets the abnormality identification criteria and abnormality filtering criteria at least twice, and at least one of those times, the statistically analyzed parameter data meets the abnormality threshold. For example, the alarm threshold specifies that the FDC system 60 issues an alarm when the resistance change satisfies the specified significance level (99.9%) and the Western Electric Rules at least twice, and at least one of those times, the resistance change is greater than or equal to about 2.5%. Once this alarm threshold is reached, the FDC system 60 issues an alarm.

Figure 3:
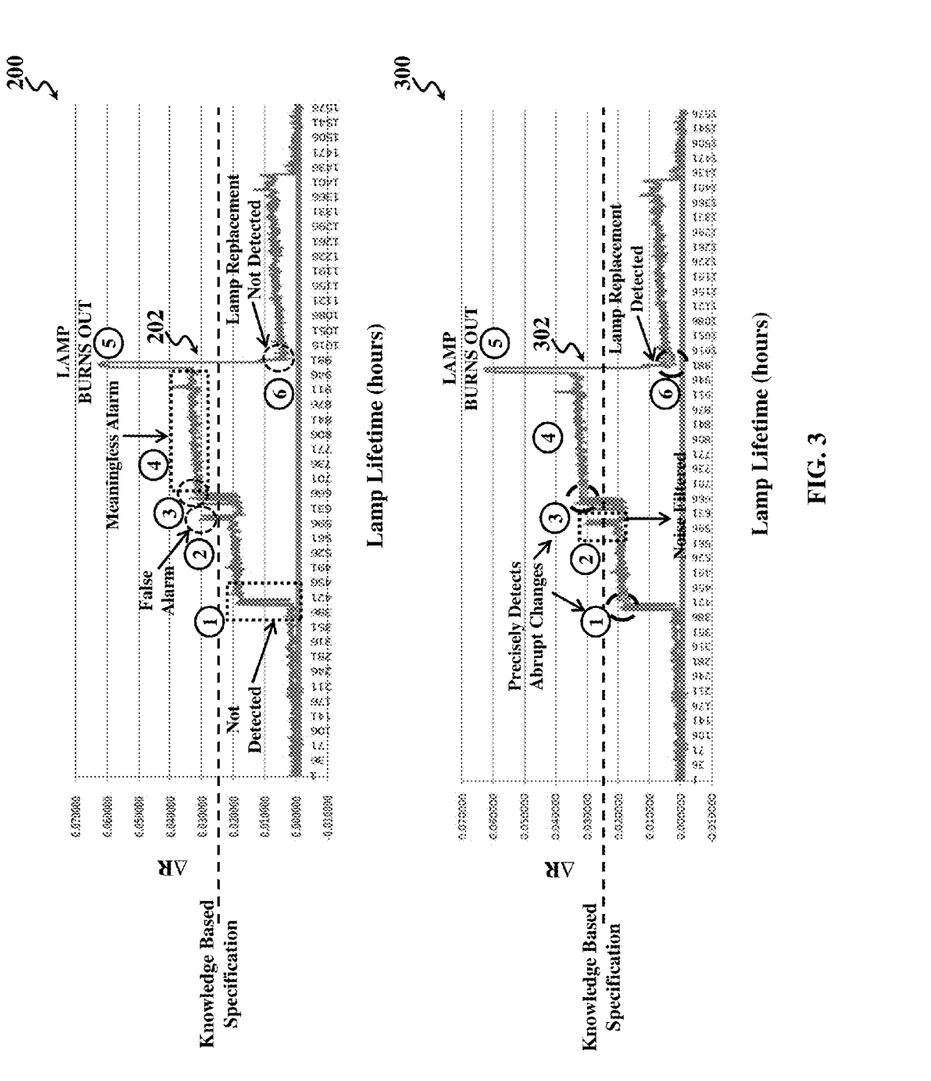
FIG. 3 provides graphs generated for monitoring a condition of a process tool, such as the process tool of the integrated circuit manufacturing system of FIG. 1, according to various aspects of the present disclosure.

FIG. 3 provides a graph 200 and a graph 300 generated by the FDC system 60 of FIG. 1 to monitor a condition of the process tool 30. The FDC system 60 implements a conventional tool monitoring process flow to evaluate a curve 202 of statistically analyzed parameter data in graph 200, and the FDC system 60 implements the tool monitoring process flow 100 of FIG. 2 to evaluate a curve 302 of statistically analyzed parameter data in graph 300. In the present example, the curve 202 of the graph 200 is identical to the curve 302 of the graph 300 so that sensitivities between the conventional tool monitoring process flow and the tool monitoring process flow 100 are readily evident. Both the curve 202 and the curve 302 model a change in resistance ($\Delta R$) of the lamps of the top inner lamp module of the CVD epitaxial tool over time (hours). The conventional monitoring process flow and the tool monitoring process flow 100 define a change in resistance that indicates an abnormality in the process tool 30, at which point the FDC system 60 should issue an alarm (referred to as the abnormality threshold (block 156) in tool monitoring process flow 100). For example, as noted above, it has been observed that lamps of the CVD epitaxial tool's lamp module typically affect wafer processing once a change in resistance of between 2% and 3% has been observed. The abnormality threshold can thus be specified as 2.5%, such that any observance of a change in resistance 2.5% and greater is identified as a real abnormality. The 2.5% abnormality threshold is indicated as "knowledge based specification" in graph 200 and graph 300. The tool monitoring process flow 100 also implements the abnormality identification criteria (block 152), the abnormality filtering criteria (block 154), and the alarm threshold (block 158) described above.

Six data behaviors of the statistically analyzed parameter data illustrate significant differences in sensitivities of the conventional tool monitoring process flow and the tool monitoring process flow 100:

(1) Data Behavior 1: In graph 200, when the FDC system 60 implements the conventional tool monitoring process flow, data behavior 1 is not detected because it does not exceed the knowledge based specification (in the present example, a change in resistance of about 2.5%). However, in graph 300, when the FDC system 60 implements the tool monitoring process flow 100, when the FDC system 60 implements the tool monitoring process flow 100, where the abnormality identification criteria (block 152) defines a significant change of resistance that indicates an abnormality and the abnormality filtering criteria (block 154) defines data behavior that indicates a real abnormality (in the present example, Western Electric Rules that define real abnormal behavior as eight consecutive data points that fall on a same side of a centerline), data behavior 1 is detected and identified as a real abnormality because it exhibits a significant change in resistance based on the abnormality identification criteria and it meets the definition of a real abnormal behavior based on the abnormality filtering criteria. Data behavior 1 does not meet the abnormality threshold so the FDC system 60 does not issue an alarm, though the FDC system 60 notes that a real abnormality has been identified for purposes of tool condition monitoring.

(2) Data Behavior 2: In graph 200, when the FDC system 60 implements the conventional tool monitoring process flow, data behavior 2 is detected because it exceeds the knowledge based specification (in the present example, a change in resistance of about 2.5%). However, data behavior 2 is not a real abnormality, and thus, a false alarm is issued when the conventional tool monitoring process flow is implemented by the FDC system 60. In contrast, in graph 300, when the FDC system 60 implements the tool monitoring process flow 100, where the abnormality identification criteria (block 152) defines a significant change of resistance that indicates an abnormality and the abnormality filtering criteria (block 154) defines data behavior that indicates a real abnormality (in the present example, Western Electric Rules that define real abnormal behavior as eight consecutive data points that fall on a same side of a centerline), data behavior 2 is filtered because though it is identified as a significant change in resistance based on the abnormality identification criteria, it does not meet the definition of a real abnormal behavior based on the abnormality filtering criteria.

(3) Data Behavior 3: In graph 200, when the FDC system 60 implements the conventional tool monitoring process flow, data behavior 3 is detected and an alarm is issued by the FDC system 60 because data behavior 3 exceeds the knowledge based specification (in the present example, a change in resistance of about 2.5%). In graph 300, when the FDC system 60 implements the tool monitoring process flow 100, data behavior 3 is also detected and an alarm is issued by the FDC system 60. More specifically, data behavior 3 is identified as a significant change in resistance based on the abnormality identification criteria and it meets the definition of a real abnormal behavior based on the abnormality filtering criteria. Further, in the present example, since the FDC system 60 has identified both data behavior 1 and data behavior 3 as meeting the abnormality identification criteria and the abnormality filtering criteria (in other words, data behavior 1 and data behavior 3 are real abnormalities), and data behavior 3 also exceeds the abnormality threshold (in other words, a change in resistance of about 2.5%), the alarm threshold is met so that the FDC system 60 knows to issue the alarm. At this point, the lamps can be replaced.

(4) Data Behavior 4: In graph 200, when the FDC system 60 implements the conventional tool monitoring process flow, data behavior 4 is detected and an alarm is issued by the FDC system 60 because data behavior 4 exceeds the knowledge based specification (in the present example, a change in resistance of about 2.5%). Such alarm is meaningless because the change in resistance remains relatively constant, and therefore, does not provide useful information about the condition of the lamps or when the lamps will burn out. In graph 300, when the FDC system 60 implements the tool monitoring process flow 100, data behavior 4 is not classified as an abnormality because it does not meet the abnormality identification criteria, and thus, the FDS system 60 does not issue a meaningless alarm.

(5) Data Behavior 5: In graph 200, when the FDC system 60 implements the conventional tool monitoring process flow, data behavior 5 (the lamp burning out) is detected and an alarm is issued by the FDC system 60 because data behavior 5 exceeds the knowledge based specification. In graph 300, when the FDC system 60 implements the tool monitoring process flow 100, data behavior 5 is also detected. More specifically, data behavior 5 is identified as a significant change in resistance based on the abnormality identification criteria and it meets the definition of a real abnormal behavior based on the abnormality filtering criteria. Further, data behavior 5 exceeds the abnormality threshold (in other words, a change in resistance of about 2.5%). The FDC system 60 may issue an alarm when data behavior 5 is detected.

(6) Data Behavior 6: In graph 200, when the FDC system 60 implements the conventional tool monitoring process flow, data behavior 6 is not detected, meaning that lamp replacement is not detected, such that the statistically analyzed parameter data can be updated with a new initial resistance ($R_O$) of the lamps. In contrast, in graph 300, when the FDC system 60 implements the tool monitoring process flow 100, data behavior 6 is detected so that the FDC system 60 detects the lamp replacement. The FDC system 60 thus updates the initial resistance ($R_O$) of the lamps so that continued monitoring includes analyzing the parameter data using the updated initial resistance ($R_O$) of the lamps.

From the graphs 200 and 300, the tool monitoring process flow 100 clearly improves monitoring of the process tool 30. Such improvement results because the tool monitoring process flow 100 precisely monitors behavior of the FDC data to detect real abnormalities (faults) of the process tool 30, instead of relying solely on a fixed definition of a real abnormality as conventional tool monitoring process flows. By combining statistical definitions with domain knowledge (definitions based on engineering experience and knowledge based on historical performance of the process tool 30) to evaluate behavior of the process tool, the tool monitoring process flow 100 can identify real abnormalities based on FDC data while significantly reducing a number of false alarms, and also provide proactive warnings associated with a condition of the process tool 30. The tool monitoring process flow 100 can thus maximize lifetime of hardware of the process tool 30 (such as lamps of the CVD epitaxial tool) and decrease the process tool's effect on characteristics of its processed wafers. Further, as discussed above, the tool monitoring process flow 100 has tunable sensitivity (the abnormality identification criteria, the abnormality filtering criteria, the abnormality threshold, and the alarm threshold are all tunable) so that abnormality detection and alertness can be adjusted depending on the type of hardware being monitored, generation of wafers processed, other consideration, or combinations thereof. Different embodiment may have different advantages, and no advantage is necessarily required of any embodiment.

Figure 4:
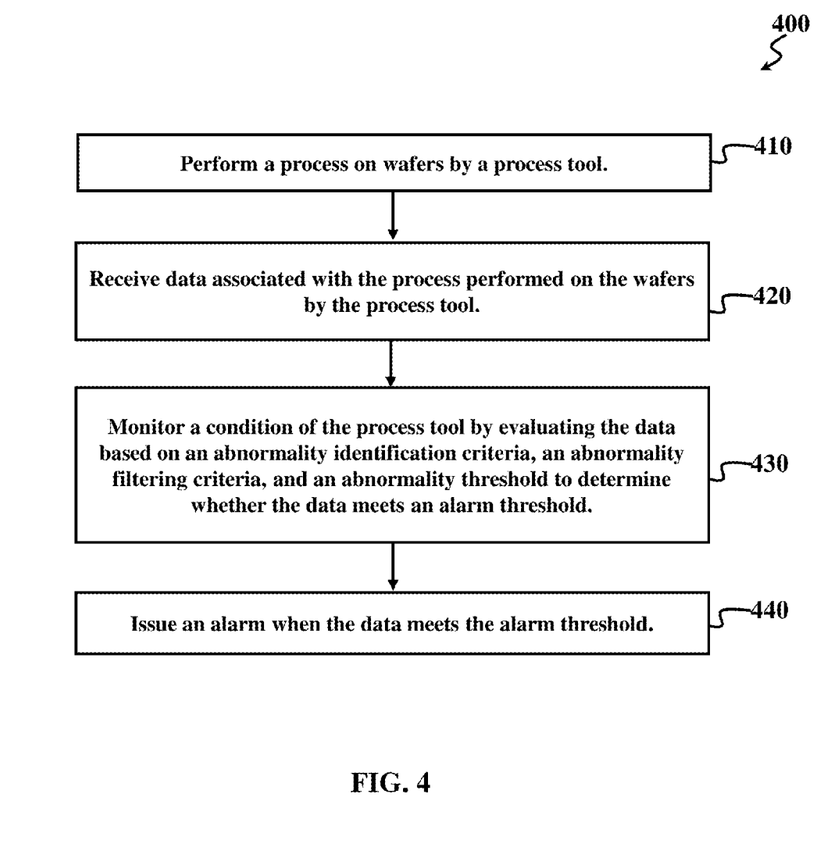
FIG. 4 is a flow chart of a method for evaluating a condition of a process tool, such as the process tool of the integrated circuit manufacturing system of FIG. 1, according to various aspects of the present disclosure.

FIG. 4 is a flow chart of a method 400 for evaluating a condition of a process tool according to various aspects of the present disclosure. In an example, the method 400 may be used to evaluate performance (or condition) of the process tool 30 in integrated circuit device fabrication system 10 of FIG. 1. The method 400 begins at block 410 where a process is performed on wafers by a process tool. At block 420 and block 430, data associated with the process performed on the wafers by the process tool is received and evaluated to monitor a condition of the process tool. The data is evaluated based on abnormality identification criteria, abnormality filtering criteria, and abnormality threshold to determine whether the data meets an alarm threshold. At block 140, an alarm is issued when the data meets the alarm threshold. Additional steps can be provided before, during, and after the method 400, and some of the steps described can be replaced or eliminated for other embodiments of the method 400.

The present disclosure contemplates a computer system for implementing the various methods and systems described herein. For example, the computer system is operable to monitor and evaluate a condition of a process tool, such as the process tool 30. In an example, the FDC system 60 includes the computer system for monitoring a condition of the process tool 30. In various implementations, devices of the computer system include a network communications device or a network computing device (for example, mobile cellular phone, laptop, personal computer, network server, etc.) capable of communicating with a network (for example, an intranet or the Internet). It should be appreciated that each of the devices may be implemented as the computer system for communication with the network in a manner as follows. In accordance with various embodiments of the present disclosure, the computer system, such as a local computer or a networked computer system, includes a bus component or other communication mechanism for communicating information, which interconnects subsystems and components, such as a processing component (for example, a processor, a micro-controller, a digital signal processor (DSP), other processing component, or combinations thereof), a system memory component (such as a RAM), a static storage component (such as a ROM), a disk drive component (such as a magnetic component, an optical component, other component, or combination thereof), network interface component (for example, a modem, Ethernet card, other network interface component, or combination thereof), a display component (for example, a cathode ray tube (CRT), liquid crystal display (LCD), other display component, or combination thereof), an input component (such as a keyboard), a cursor control component (such as a mouse or a trackball), and an image capture component (such as an analog or digital camera). In one implementation, the disk drive component includes a database having one or more disk drive components.

In accordance with embodiments of the present disclosure, the computer system performs specific operations by processor executing one or more sequences of one or more instructions contained in system memory component. In an example, such instructions are read into system memory component from another computer readable medium, such as static storage component or disk drive component. In another example, hard-wired circuitry is used in place of (or in combination with) software instructions to implement the present disclosure. In further accordance with embodiments of the present disclosure, logic is encoded in a computer readable medium, which refers to any medium that participates in providing instructions to the processor component for execution. Such a medium takes many forms, including but not limited to, non-volatile media and volatile media. In an example, the computer readable medium is non-transitory. In various implementations, non-volatile media includes optical or magnetic disks, such as the disk drive component, and volatile media includes dynamic memory, such as system memory component. In one aspect, data and information related to execution instructions is transmitted to computer system via a transmission media, such as in the form of acoustic or light waves, including those generated during radio wave and infrared data communications. In various implementations, transmission media includes coaxial cables, copper wire, and fiber optics, including wires that comprise bus.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In various embodiments of the present disclosure, the computer system performs execution of instruction sequences to practice the present disclosure. In various other embodiments of the present disclosure, various computer systems, such as computer system, are coupled by a communication link (for example, a communications network, such as a LAN, WLAN, PTSN, and/or various other wired or wireless networks, including telecommunications, mobile, and cellular phone networks) and perform instruction sequences to practice the present disclosure in coordination with one another. In various examples, the computer system transmits and receives messages, data, information and instructions, including one or more programs (in other words, application code) through communication link and communication interface. The processor component can execute the programs code as received and/or stored in the disk drive component or some other non-volatile storage component for execution.

Where applicable, various embodiments provided by the present disclosure are implemented using hardware, software, or combinations of hardware and software. Also, where applicable, the various hardware components and/or software components set forth herein are combined into composite components comprising software, hardware, and/or both without departing from the spirit of the present disclosure. Where applicable, the various hardware components and/or software components set forth herein are separated into sub-components comprising software, hardware, or both without departing from the scope of the present disclosure. In addition, where applicable, it is contemplated that software components are implemented as hardware components and vice-versa. Software, in accordance with the present disclosure, such as computer program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein are changed, combined into composite steps, and/or separated into sub-steps to provide features described herein.

The present disclosure provides for many different embodiments. An exemplary method includes receiving data associated with a process performed on wafers by an integrated circuit manufacturing process tool and monitoring a condition of the integrated circuit manufacturing process tool by evaluating the data based on an abnormality identification criteria, an abnormality filtering criteria, and an abnormality threshold to determine whether the data meets an alarm threshold. The method further includes issuing an alarm when the data meets the alarm threshold. In an example, the abnormality identification criteria defines a first data behavior that indicates an abnormal behavior of the integrated manufacturing process tool, the abnormality filtering criteria defines a second data behavior that indicates a real abnormal behavior of the integrated circuit manufacturing process tool, and the abnormality threshold defines a third data behavior based on historical data that indicates a real abnormal behavior of the integrated circuit manufacturing process tool. Evaluating the data based on the abnormality identification criteria includes identifying behavior in the data that exhibits the first data behavior. Evaluating the data based on the abnormality filtering criteria includes determining whether the identified behavior of the data that exhibits the first data behavior also exhibits the second data behavior. Evaluating the data based on the abnormality threshold includes determining whether identified behavior of the data exhibiting the first data behavior and the second data behavior exhibits the third data behavior. In an example, the abnormality identification criteria statistically define a significance level that indicates abnormal behavior of the integrated circuit manufacturing process tool. In an example, the abnormality filtering criteria are Western Electric Rules. In an example, the second data behavior indicates the real abnormal behavior when eight consecutive data points of the identified behavior fall on a same side of a centerline of the evaluated data. The alarm threshold defines when to issue an alarm based on behavior of the data, and in an example, the alarm threshold is met when the behavior of the data exhibits the first data behavior, the second data behavior, and the third data behavior. The abnormality identification criteria, the abnormality filtering criteria, the abnormality threshold, and the alarm threshold may be defined based on one of a type of the integrated circuit manufacturing process tool, a technology generation of wafers fabricated by the integrated circuit manufacturing process tool, and a combination thereof.

Another exemplary method includes defining the abnormality identification criteria includes statistically defining a first data behavior that indicates abnormal behavior of the process tool; defining the abnormality filtering criteria includes statistically defining a second data behavior that indicates real abnormal behavior of the process tool; defining the abnormality threshold includes defining a third data behavior that indicates real abnormal behavior of the process tool, wherein the third data behavior is based on historical data associated with the process tool; and defining the alarm threshold includes defining a number of identified real abnormalities required before issuing the alarm. In an example, statistically defining the first data behavior includes specifying a significance level that indicates abnormal behavior of the process tool. In an example, the identifying, based on the abnormality identification criteria, abnormalities in data associated with the process tool includes identifying data that exhibits the first data behavior; and the filtering, based on the abnormality filtering criteria, the identified abnormalities to identify real abnormalities includes determining whether the identified data that exhibits the first data behavior also exhibits the second data behavior. In an example, the identified real abnormalities satisfy the abnormality threshold and the alarm threshold when at least two real abnormalities are identified and at least one of the at least two real abnormalities exceeds the abnormality threshold.

An exemplary apparatus includes a process tool configured to perform a process on wafers and a fault detection and classification system configured to monitor a condition of the process tool. The fault detection and classification system is configured to receive data associated with the process performed on the wafers by the process tool, and evaluate the data based on an abnormality identification criteria, an abnormality filtering criteria, and an abnormality threshold to determine whether the data meets an alarm threshold. The fault detection and classification system is further configured to issue an alarm when the data meets the alarm threshold. In an example, the abnormality identification criteria defines a first data behavior that indicates an abnormal behavior of the process tool; the abnormality filtering criteria defines a second data behavior that indicates a real abnormal behavior of the process tool; the abnormality threshold defines a third data behavior based on historical parameter data that indicates a real abnormal behavior of the process tool; and the alarm threshold is met when the behavior of the data exhibits the first data behavior, the second data behavior, and the third data behavior. In such example, evaluating the data includes identifying behavior in the data that exhibits the first data behavior; determining whether the identified behavior of the data that exhibits the first data behavior also exhibits the second data behavior; and determining whether identified behavior of the data exhibiting the first data behavior and the second data behavior exhibits the third data behavior.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    receiving, by a fault detection and classification (FDC) system, a first data set and a second data set associated with a process performed on wafers by an integrated circuit manufacturing process tool, wherein the integrated circuit manufacturing process tool is a chemical vapor deposition tool; and
    monitoring, by the FDC system, a condition of the integrated circuit manufacturing process tool using the first and second data sets, wherein the monitoring includes:
        evaluating the first and second data sets based on an abnormality identification criteria that includes identifying data in the first and second data sets that exhibits a first data behavior that indicates an abnormal behavior of the integrated circuit manufacturing process tool;
        evaluating the first and second data sets based on an abnormality filtering criteria that includes determining whether the data that exhibits the first data behavior also exhibits a second data behavior that indicates a real abnormal behavior of the integrated circuit manufacturing process tool; and
        evaluating the first and second data sets based on an abnormality threshold that includes determining whether the data exhibiting the first data behavior and the second data behavior also exhibits a third data behavior based on historical data that indicates a real abnormal behavior of the integrated circuit manufacturing process tool; and
    detecting, by the FDC system, that a component of the integrated circuit manufacturing process tool has been serviced after the FDC system determines that data from the first data set exhibits the first, second, and third data behaviors and data from the second data set exhibits the first and second data behaviors without exhibiting the third data behavior, wherein the component is a lamp module including one or more infrared lamps; and
    in response to the FDC system detecting that the process tool has been serviced, updating a parameter associated with the serviced component, the parameter being used by the FDC system in identifying subsequent abnormalities, wherein the parameter is an initial resistance value associated with the lamp module.

2. The method of claim 1 further including issuing an alarm after it is determined, by the FDC system, that data from the first data set exhibits the first, second, and third data behaviors and data from the second data set exhibits the first and second data behaviors without exhibiting the third data behavior.

3. The method of claim 1 wherein the abnormality identification criteria statistically defines a significance level that indicates abnormal behavior of the integrated circuit manufacturing process tool.

4. The method of claim 1 wherein the second data behavior indicates the real abnormal behavior when eight consecutive data points of the identified behavior fall on a same side of a centerline of the evaluated data.

5. The method of claim 1 wherein the abnormality identification criteria, the abnormality filtering criteria, the abnormality threshold, and an alarm threshold are defined based on one of a type of the integrated circuit manufacturing process tool, a technology generation of wafers fabricated by the integrated circuit manufacturing process tool, and a combination thereof.

6. The method of claim 1, further comprising measuring a first resistance value and a second resistance value associated with a component of the integrated circuit manufacturing process tool.

7. The method of claim 6, wherein the first data set includes the first resistance value and the second data set includes the second resistance value.

8. The method of claim 6, wherein detecting, by the FDC system, that the integrated circuit manufacturing process tool has been serviced includes detecting, by the FDC system, that the component of the integrated circuit manufacturing process tool has been replaced.

9. The method of claim 8, further comprising servicing the integrated circuit manufacturing process tool by replacing the component of the integrated circuit manufacturing process tool.

10. A tool condition monitoring method comprising:
    defining an abnormality identification criteria, an abnormality filtering criteria, an abnormality threshold, and an alarm threshold;
    measuring a first resistance value and a second resistance value associated with a component of a process tool;
    identifying, based on the abnormality identification criteria, abnormalities in a first data set and a second data set associated with a process tool by identifying data in the first and second data sets that exhibits a first data behavior that indicates an abnormal behavior of the process tool, wherein the first data set includes the first resistance value and the second data set includes the second resistance value;

filtering, based on the abnormality filtering criteria, the identified abnormalities to identify real abnormalities by determining whether the identified data that exhibits the first data behavior also exhibits a second data behavior that indicates a real abnormal behavior of the process tool;

determining whether the identified real abnormalities satisfy the abnormality threshold and the alarm threshold, wherein determining whether the identified real abnormalities satisfy the abnormality threshold and the alarm threshold includes evaluating the first and second data sets based on the abnormality threshold to determine whether the data exhibiting the first data behavior and the second data behavior also exhibits a third data behavior based on historical data that indicates a real abnormal behavior of the process tool;

issuing an alarm when the identified real abnormalities satisfy the abnormality threshold and the alarm threshold; and detecting, by a fault detection and classification (FDC) system, that the process tool has been serviced after it is determined, by the FDC system, that data from the first data set exhibits the first, second, and third data behaviors and data from the second data set exhibits the first and second data behaviors without exhibiting the third data behavior, wherein the process tool is a chemical vapor deposition (CVD) tool and the component is a lamp module.

11. The tool condition monitoring method of claim 10 wherein the abnormality identification criteria, the abnormality filtering criteria, the abnormality threshold, and the alarm threshold are defined based on one of a type of the process tool, a technology generation of wafers processed by the process tool, and a combination thereof.

12. The tool condition monitoring method of claim 10 wherein:

defining the abnormality identification criteria includes statistically defining the first data behavior that indicates abnormal behavior of the process tool;

defining the abnormality filtering criteria includes statistically defining the second data behavior that indicates real abnormal behavior of the process tool;

defining the abnormality threshold includes defining the third data behavior that indicates real abnormal behavior of the process tool; and defining the alarm threshold includes defining a number of identified real abnormalities required before issuing the alarm.

13. The tool condition monitoring method of claim 12 wherein statistically defining the first data behavior includes specifying a significance level that indicates abnormal behavior of the process tool.

14. The tool condition monitoring method of claim 10, further comprising measuring a first resistance value and a second resistance value associated with a component of the process tool.

15. The tool condition monitoring method of claim 14, wherein the first data set includes the first resistance value and the second data set includes the second resistance value.

16. The tool condition monitoring method of claim 10, wherein detecting, by the FDC system, that the process tool has been serviced includes detecting, by the FDC system, that the component of the process tool has been replaced.

17. The tool condition monitoring method of claim 16, further comprising servicing the process tool by replacing the component of the process tool.

18. The tool condition monitoring method of claim 10, wherein the process tool is a chemical vapor deposition tool.

19. The method of claim 10, wherein each of the first resistance value and the second resistance value is a percentage of variance between an observed resistance and an initial resistance.

* * * * *